United States Patent [19]
Akashi et al.

[11] Patent Number: 6,035,149
[45] Date of Patent: Mar. 7, 2000

[54] OUTPUT APPARATUS AND METHOD IN WHICH A SUITABLE ANALYZER IS SELECTED FOR INPUT INFORMATION, AND THE INPUT INFORMATION IS SKIPPED IF NO ANALYZER IS SELECTED

[75] Inventors: Masamichi Akashi, Yokohama; Satoshi Nagata, Tama; Yutaka Murakami; Yoichi Toyokura, both of Yokohama; Yukio Kanakubo, Kasukabe; Hiroharu Takahashi, Yokohama; Masami Kashiwazaki, Kawasaki, all of Japan

[73] Assignee: Canon Kabushiki Kaisha, Tokyo, Japan

[21] Appl. No.: 08/906,109

[22] Filed: Aug. 5, 1997

Related U.S. Application Data

[62] Division of application No. 08/224,665, Apr. 7, 1994, Pat. No. 5,666,584.

[30] Foreign Application Priority Data

| Apr. 7, 1993 | [JP] | Japan | .................................... 5-103707 |
| Jun. 25, 1993 | [JP] | Japan | .................................... 5-177620 |
| Dec. 27, 1993 | [JP] | Japan | .................................... 5-333511 |
| Apr. 4, 1994 | [JP] | Japan | .................................... 6-66047 |

[51] Int. Cl.⁷ .......................... G03G 15/00; G03G 21/00
[52] U.S. Cl. ............................................... 399/9; 395/112
[58] Field of Search ........................ 399/1, 2, 9; 395/112

[56] References Cited

U.S. PATENT DOCUMENTS

| 4,441,804 | 4/1984 | Shibazaki et al. ...................... 355/209 |
| 4,496,237 | 1/1985 | Schron .................................... 355/209 |
| 4,688,929 | 8/1987 | Taniguchi et al. ...................... 355/206 |
| 4,786,920 | 11/1988 | Igarashi ............................. 355/313 X |
| 4,799,081 | 1/1989 | Kikuno et al. ........................... 355/209 |
| 4,814,824 | 3/1989 | Ito et al. . |
| 4,899,140 | 2/1990 | Ito et al. .............................. 355/209 X |
| 5,298,936 | 3/1994 | Akitake et al. .......................... 354/471 |
| 5,444,826 | 8/1995 | Okada .................................... 395/112 |
| 5,561,744 | 10/1996 | Sugaya et al. .......................... 395/112 |

FOREIGN PATENT DOCUMENTS

| 57-103871 | 6/1982 | Japan . |
| 63-051165 | 3/1988 | Japan . |
| 1-285820 | 11/1989 | Japan .................................... 355/209 |
| 4-172539 | 6/1992 | Japan .................................... 355/209 |
| 5-057089 | 3/1993 | Japan . |
| 5-232895 | 9/1993 | Japan .................................... 355/209 |

*Primary Examiner*—Fred L. Braun
*Attorney, Agent, or Firm*—Fitzpatrick, Cella, Harper & Scinto

[57] ABSTRACT

An output apparatus and method receives first information from an external source, generates second information based on the received first information, and outputs the generated second information. The apparatus includes a selector for discriminating the received first information by comparing a code included in the first information with codes provided in a number of analyzers and for selecting one of the number of analyzers suitable for the first information. The apparatus also includes a controller for skipping the received first information when the selector can select no suitable analyzer, when no data is input for a predetermined time to an input interface via which the first information was received, or until the input interface is switched.

10 Claims, 15 Drawing Sheets

FIG. 7

| NO. | LED DISPLAY ① | ② | ③ | ④ | ⑤ | ERROR CONTENTS |
|---|---|---|---|---|---|---|
| 1 | ○ | ○ | ○ | ○ | ○ | NONE |
| 2 | ● | ○ | ○ | ○ | ○ | PAGE BUFFER OVERFLOW |
| 3 | ○ | ● | ○ | ○ | ○ | PRINT OVERRUN |
| 4 | ○ | ○ | ● | ○ | ○ | INPUT BUFFER OVERFLOW |
| 5 | ○ | ○ | ○ | ● | ○ | PRINT CHECK |
| 6 | ○ | ○ | ○ | ○ | ● | WORK MEM OVERFLOW |
| 7 | ● | ● | ○ | ○ | ○ | DOWNLOAD OVERFLOW |
| 8 | ● | ○ | ● | ● | ○ | FRAME BUFFER OVERFLOW |
| 9 | ● | ○ | ○ | ○ | ○ | VECTOR GRAPHICS REJECTION |
| 10 | ● | ○ | ○ | ○ | ● | FONT REGISTRATION FULL |
| 11 | ○ | ● | ○ | ○ | ● | NVRAM ERROR |

⑤ ④ ③ ② ①
ALARM JAM PAPER OUT DATA ON LINE

○ OFF
● ON

FUNCTION 1:RESET
FUNCTION 2:TEST PRINT
FUNCTION 3:NVRAM INITIALIZE
FUNCTION 4:CANCEL

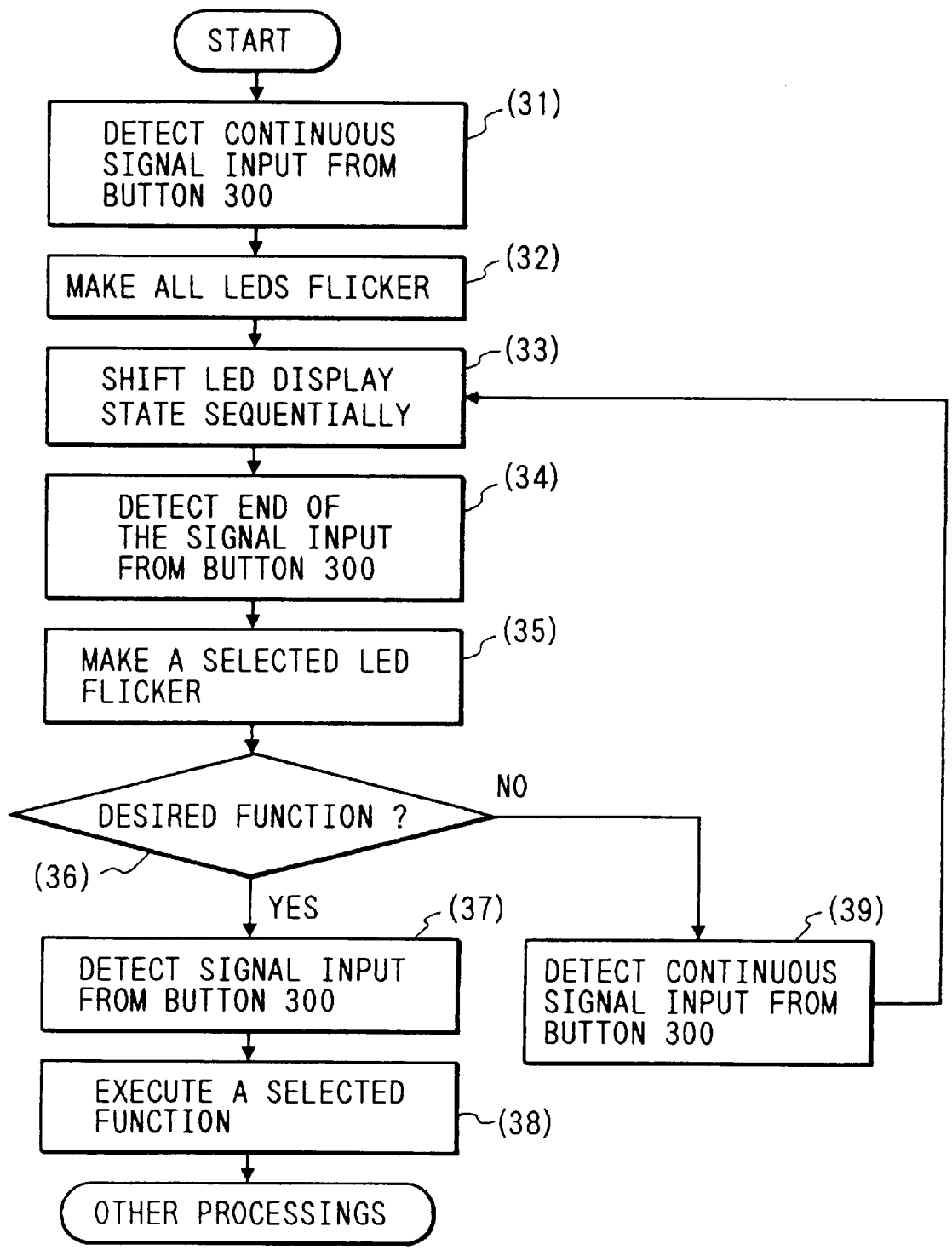

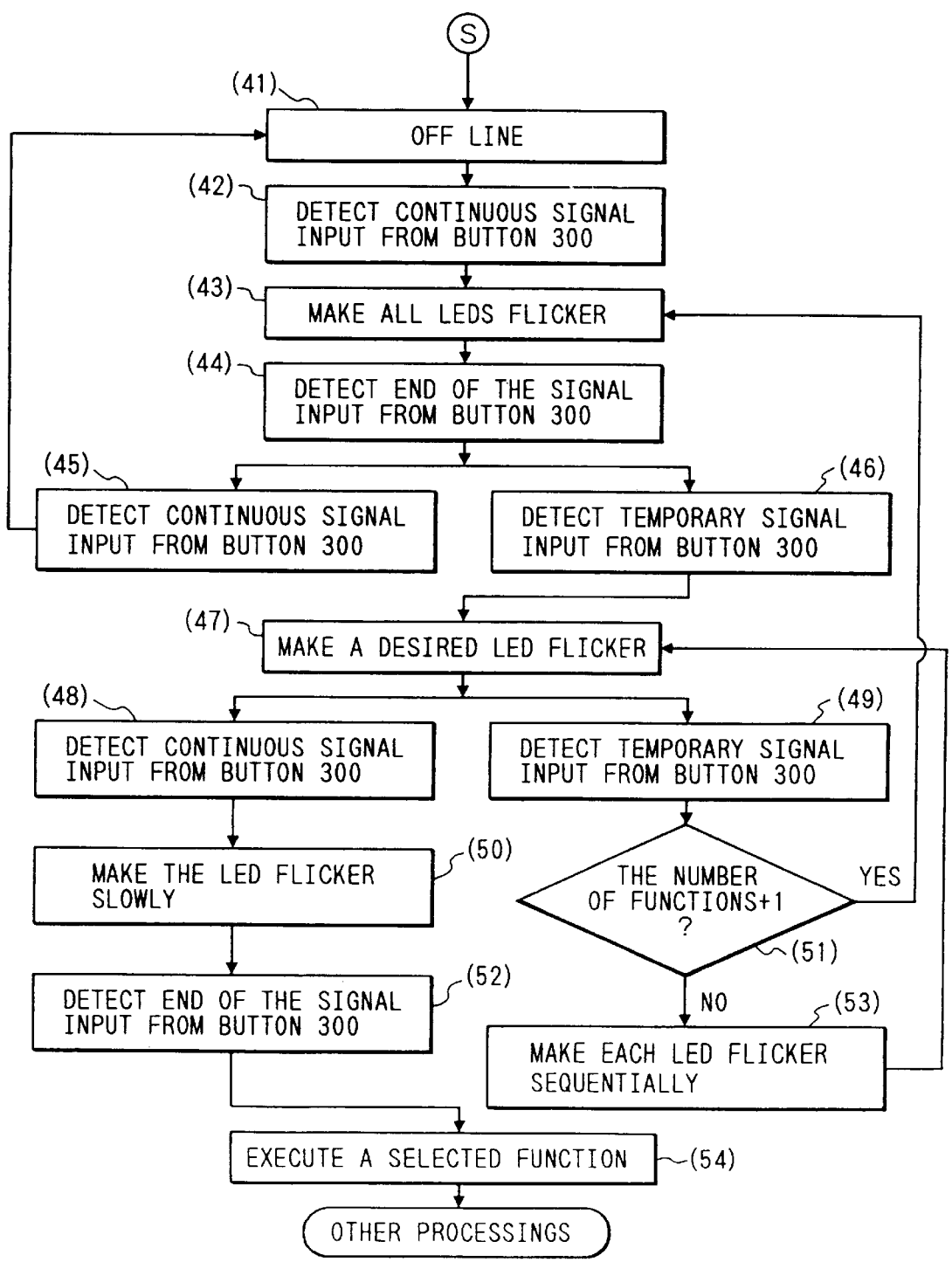

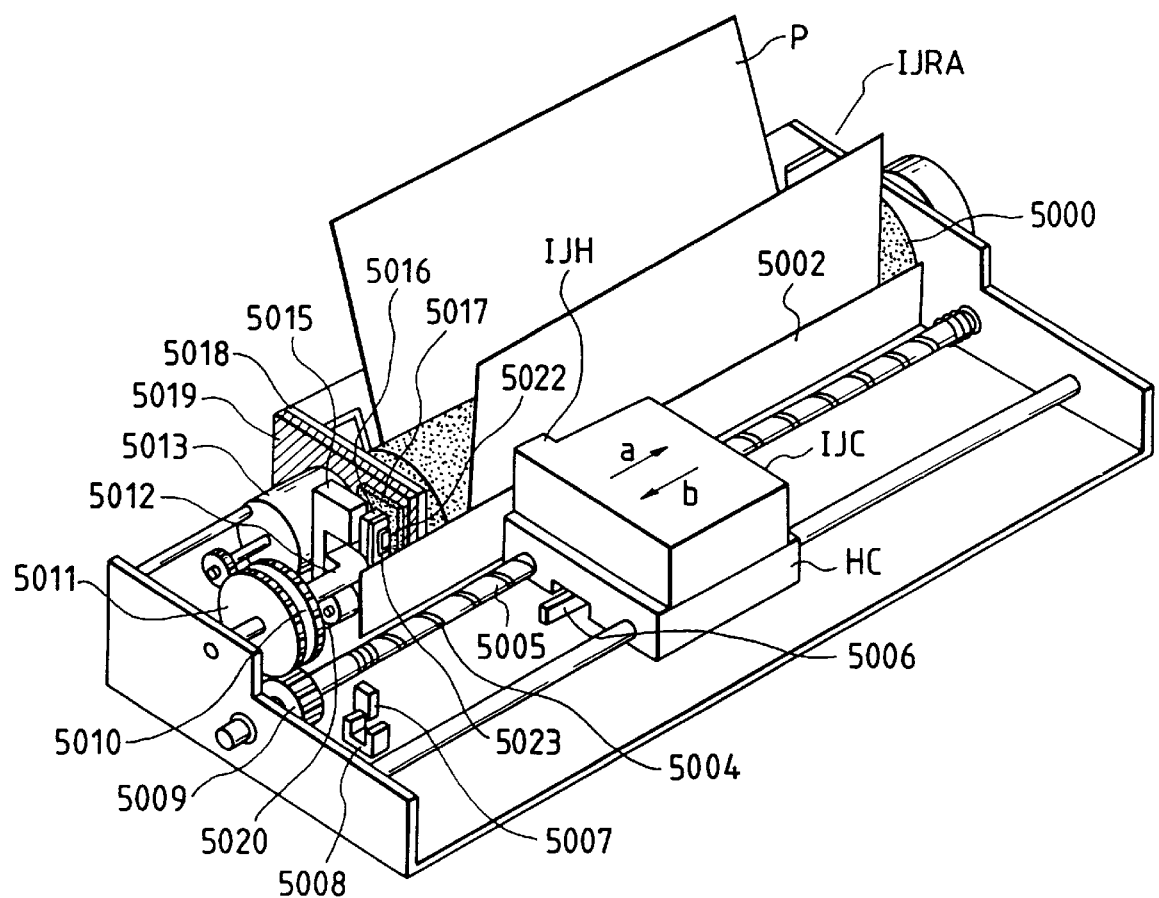

OUTPUT APPARATUS AND METHOD IN WHICH A SUITABLE ANALYZER IS SELECTED FOR INPUT INFORMATION, AND THE INPUT INFORMATION IS SKIPPED IF NO ANALYZER IS SELECTED

This application is a division of application Ser. No. 08/224,665, filed Apr. 7, 1994, now U.S. Pat. No. 5,666,584.

BACKGROUND OF THE INVENTION

1. Field of the Invention

The present invention relates to an information output method of an operation unit in an information output apparatus for generating output information on the basis of input information input from the outside and also relates to an information output apparatus having such an operation unit.

2. Related Background Art

FIG. 18 is a plan view showing an example of an operation panel of such a kind of information output apparatus.

In the diagram, reference numeral 200 denotes an operation panel unit having a liquid crystal display (LCD) 201 which can display about 16 or more characters, a key input unit 203 including seven or more key portions, and the like in order to realize complicated display and operation. Reference numeral 202 denotes a state display.

By using the operation panel with such a construction as mentioned above, a state and errors of the apparatus can be displayed, an output environment can be changed, and other special operations such as output of a list of output environment or a list of fonts and resetting processing can be executed.

Such a kind of apparatus has one or a plurality of control code analyzing means and generally doesn't judge whether input data is data which can be printed by the apparatus or not. An output processing is executed by using either one of the control code analyzing means.

For example, in a conventional printing apparatus, there has been proposed a printing apparatus such that data is received from a host computer on a page unit basis, a character code or graphics data which was transmitted from the host computer is developed into a bit map, image data transmitted from the host computer is developed, or an external character font or logotype is developed, thereby forming bit map information as output information on a page unit basis and printing and outputting.

A printing mechanism (printer engine) which is provided for the printing apparatus is generally constructed in the following manner. The bit map information of the page unit mentioned above is converted into the video signal and is developed into the print data and transferred to the printing mechanism. In the printing mechanism, in order to execute an electrophotographic processing such that the image corresponding to the page unit bit map information is formed onto a photosensitive drum by a developing agent such as a toner or the like synchronously with the video signal by using a light emitting device such as laser beam, LED array, liquid crystal shutter, or the like, the developed image is copy transferred onto a recording medium, and stable print result is output by using a fixing device at a high temperature and a high voltage, the operation unit generally has a plurality of keys and a display panel in order to set printing modes corresponding to various kinds of settings. In addition to the ordinary printing mode, in case of executing a mode to set an interface format or the like of a test print or print information, what is called a "special" display mode, it can be executed by a combination such that the above plurality of keys are simultaneously depressed or the like.

In the case where the number of keys which are provided in the operation unit is small, however, it is impossible to perform an instruction to shift the operating mode to many special display modes. In the printing apparatus accompanied with the shift to the special display modes, there are problems such that the number of keys is large, the costs of the operation unit increase, and when the operating mode is shifted to the special display modes, a burden of the key operation of the operator increases and an erroneous operation is caused, and the like.

The costs of the operation panel which is occupied in the printing apparatus main body rise with an increase in number of keys, so that such a drawback becomes an obstacle for reduction in costs.

However, when the apparatus is simplified by eliminating the operation panel, there occurs a problem such that information of printer resources with respect to special operating functions such as printing of a list of printing environment or a list of fonts, resetting operation, display of detailed error information, and the like which are indispensable on the product specifications and need to be executed by using the operation panel cannot be provided to the user.

In the case where the user erroneously sent a control code of the kind which cannot be printed by the printing apparatus or where the user erroneously set a communication interface between the external apparatus and the printing apparatus, for example, even at a transfer speed of RS232C, either one of the control code analyzers executes an analysis processing. Therefore, there is a case where the wrong printing continuously executed over a few pages, so that there is a problem such that an electric power, print sheets, and toner are wasted.

Further, in order to avoid such waste, it is necessary for the user to execute the operation to cancel the input data by using the operation panel or the like of the printing apparatus. Particularly, in case of using the printing apparatus in the network environment, its printing state cannot be grasped, so that there is a serious problem such that the wasted printing operation is continued until completion.

SUMMARY OF THE INVENTION

The present invention is made to solve the above problems and it is an object of the invention to provide an information output apparatus and an information output method in which, by monitoring instructing states of a display and a key input which are necessary for an ordinary operating mode display and by switching a display mode of an operation unit, a complicated operating mode display can be certainly executed by a cheap operation unit construction.

According to an information output method of the present invention, a depressing state of a predetermined key is monitored, an instruction to switch display modes of a plurality of displays which were allocated to predetermined state alarms in accordance with the depressing time is made to another display mode, and after completion of the switching instruction, either one of the information display processings which were allocated to the displays which are sequentially turned on is started in accordance with the depression instruction state of the key.

According to the information output method of the invention, after completion of either one of the information display processings which were allocated to the displays which are sequentially turned on by the depressing instruction of the key, the switching to the ordinary display mode is controlled.

An information output apparatus according to the present invention comprises: a plurality of display means each for displaying a predetermined apparatus state; key input means for instructing a predetermined operation; switching means for monitoring a key input state by the key input means and for switching a display mode of each of the display means to another mode; and control means for controlling the start of either one of the information display processings which were allocated to the display means which are sequentially turned on in accordance with a key input state by the key input means after the switching instruction was performed by the switching means.

An information output apparatus according to the invention comprises: a plurality of display means to which a plurality of special function processings have been allocated; mode switching means for judging an input state of instruction information to instruct the execution of a plurality of special function processings and for switching from an ordinary display mode to a special display mode; mode shift display means for displaying a state in which the switching operation to the special display mode by the mode switching means is being executed by changing display styles of those plurality of display means; special function selection candidate display means for judging the input state of the instruction information during the display of the special display mode by the mode shift display means and for sequentially displaying each display means arranged in correspondence to each special function as a special function selection candidate by a display style different from that in the ordinary display; and special mode executing means for judging the input state of the instruction information during the display of the special function selection candidate by the special function selection candidate display means and for executing the special mode corresponding to the special function selection candidates which are being displayed.

An information output apparatus according to the invention comprises: a plurality of display means to which a plurality of special function processings have been allocated; mode switching means for judging an input state of instruction information to instruct the execution of a plurality of special function processings and for switching from an ordinary display mode to a special display mode; mode shift display means for displaying a state indicating that the switching to the special display mode by the mode switching means is being executed by changing display styles of the plurality of display means; special function selection candidate display means for judging the input state of the instruction information during the display of the special display mode by the mode shift display means and for sequentially displaying each display means arranged in correspondence to each of the special functions as a special function selection candidate by a display style different from that in the ordinary display; special mode executing means for judging the input state of the instruction information during the display of the special function selection candidate by the special function selection candidate display means and for executing a special mode corresponding to the special function selection candidate which is being displayed; and recovery means for judging the input state of the instruction information during the display c)f the special function selection candidate by the special function selection candidate display means, for cancelling the specified special mode, and for recovering to the display of the special function selection candidate by each display means.

According to an information output method according to the present invention, the display styles of each or all of the display means are sequentially changed in accordance with the input state of the instruction information, a plurality of mode candidates which can be selected are displayed, the input state of the instruction information during the display of the special mode candidate is judged, and either one of the special modes corresponding to the display means which were displayed as special mode candidates is executed on the basis of the result of the judgment.

As described above, according to the information output method, a depressing state of a predetermined key is monitored, the switching from the display modes of the plurality of displays allocated to predetermined state alarms to another display mode in accordance with the depressing time is instructed, and after completion of the switching instruction, either one of the information display processings allocated to the displays which are sequentially turned on is started in accordance with the depression instructing state of the key. Therefore, many information display modes can be certainly set even by small key input means and display means and their states can be confirmed.

According to the information output method, after completion of either one of the information display processings allocated to the displays which are sequentially turned on by the depressing instruction of the key, the switching to the ordinary display mode is controlled. Therefore, the operating mode can be certainly returned to the ordinary mode by a simple key input instruction.

In the information output apparatus, when the key input state by the key input means is monitored and the switching means switches the display mode of each display means to another display mode, the control means controls the start of either one of the information display processes allocated to the display means which are sequentially turned on in accordance with the key input state by the key input means after completion of the switching instruction. Therefore, many display modes can be certainly set even by a small number of key input means and display means and their states can be confirmed.

Therefore, the instruction of complicated operation modes and the confirmation of the instructing state can be certainly performed by a combination of the minimum number of key input means and display means. A construction of the operation unit for setting many complicated operating modes can be remarkably simplified and the costs of the operation unit can be also fairly reduced.

As described above, according to an information output apparatus of the invention, while a state indicating that the switching operation to the special display mode by the mode switching means is being displayed by the mode shift display means by changing the display styles of the plurality of display means, the input state of the instruction information is judged. The special function selection candidate display means sequentially displays each of the display means arranged in correspondence to each special function as a special function selection candidate and judges the input state of the instruction information during the display of the special function selection candidate. The special mode executing means executes the special mode corresponding to the special function selection candidate which is being displayed. Therefore, the display of the candidates of a plurality of special modes which can be selected and the special modes can be executed by a small number of instruction information input means and display means.

According to the information output apparatus, while a state indicating that the switching to the special display mode by the mode switching means is being displayed by the mode shift display means by changing the display styles of the plurality of display means, the input state of the instruction information is judged. The special function selection candidate display means sequentially displays each of the display means arranged in correspondence to each of the special functions as a special function selection candidate by a display style different from that in the ordinary display and judges the input state of the instruction information during the display of the special function selection candidate. The special mode executing means executes the special mode corresponding to the special candidate selection function which is being displayed. Or, the recovery means cancels the special mode which was specified by judging the input state of the instruction information during the display of the special function selection candidate by the special function selection candidate display means, thereby recovering to the display of the special function selection candidate by each display means. Therefore, the display of the candidates of a plurality of special modes which can be selected and the special modes can be executed by a small number of instruction information input means and display means. Even if a special mode is erroneously specified, the display can be recovered to the special mode candidate display with good reproducibility.

According to the information output method of the invention, the display styles of each or all of the display means are sequentially changed in accordance with the input state of the instruction information, a plurality of special mode candidates which can be selected are displayed, the input state of the instruction information during the display of the special mode candidate is judged, and either one of the special modes corresponding to the display means displayed as a special mode candidate is executed on the basis of the result of the judgment. Therefore, there are effects such that the display of a plurality of special mode candidates which can be selected and the special modes can be executed by a small number of instruction information input means and display means of the operation unit, and the like.

BRIEF DESCRIPTION OF THE DRAWINGS

FIG. 7 is a diagram showing an example in which error contents are encoded and displayed;

FIG. 12 is a flowchart showing an example of a special display mode switching display control procedure in the third embodiment;

FIG. 14 is a flowchart showing an example of a special display mode switching display control procedure in the fourth embodiment;

FIG. 19 is an external view for explaining a construction of another printing apparatus to which the invention can be applied.

DETAILED DESCRIPTION OF THE PREFERRED EMBODIMENTS

First Embodiment

Prior to explaining a construction of the embodiment, a construction of a laser beam printer (hereinafter, also simply abbreviated to as LBP) to which the present embodiment is applied will now be described with reference to FIG. 1.

Figure 1:
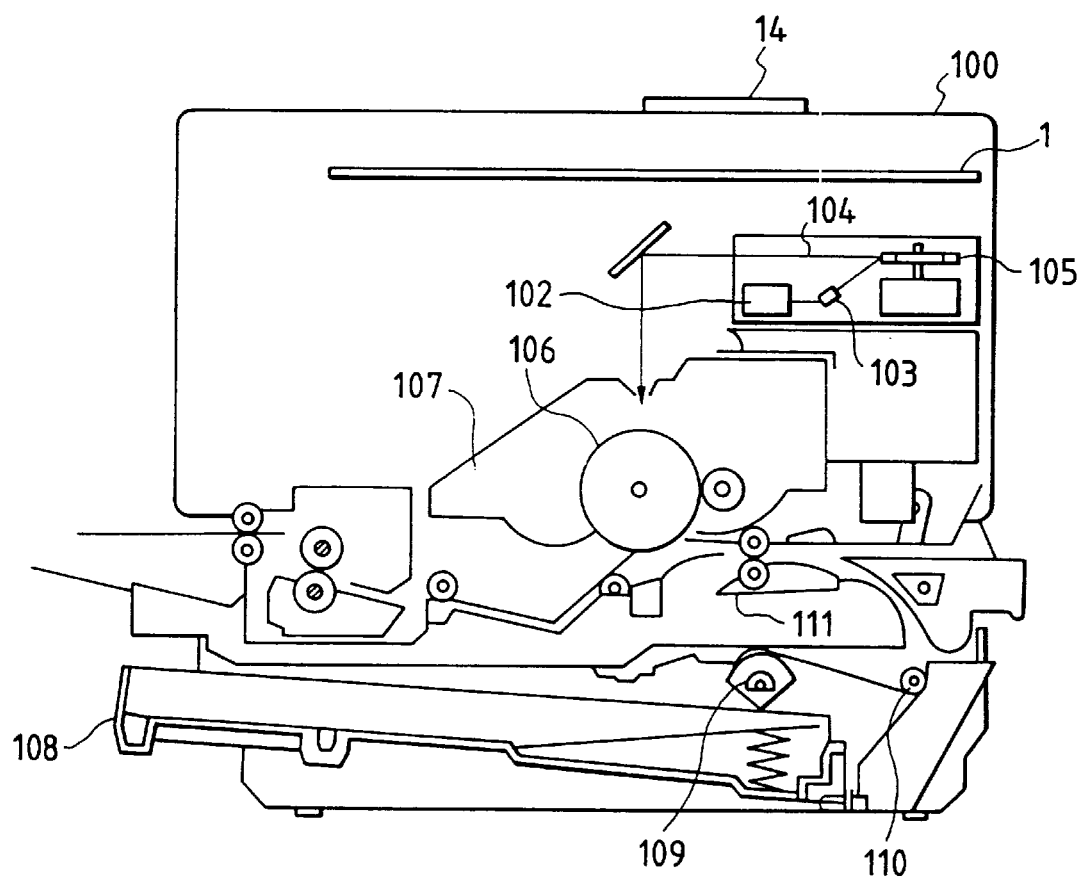
FIG. 1 is a cross sectional view for explaining a construction of a laser beam printer to which the present invention is applied.

FIG. 1 is a cross sectional view for explaining a construction of the laser beam printer to which the embodiment is applied. The laser beam printer can register a character pattern or a standard format (form data) from a data source of a host computer or the like (not shown).

In the diagram, reference numeral 100 denotes a laser beam printer (LBP) main body (hereinafter, simply referred to as a main body). The LBP main body receives and stores input information such as character data (character code), form information, macro command, etc. which are supplied from an external apparatus 2 such as a host computer shown in FIG. 2 or the like connected to the outside. The LBP main body forms a corresponding character pattern, a form pattern, or the like in accordance with the information and forms an image onto a recording paper as a recording medium. Reference numeral 14 denotes an operation panel in which switches for operation, an LED display to display a state of the printer, and the like are arranged. Reference numeral 1 denotes a controller (printer control unit) for controlling the whole LBP 100 and analyzing input information such as character information or the like which is supplied from the host computer. The controller 1 mainly converts character information to a video signal of a corresponding character pattern and outputs to a laser driver 102. The laser driver 102 is a circuit to drive a semiconductor laser 103 and on/off switching a laser beam 104 which is generated from the semiconductor laser 103 in accordance with the input video signal. Thus, an electrostatic latent image is formed onto an electrostatic drum 106.

The latent image is developed by a developing unit 107 around the drum 106 and, after that, it is copy transferred onto a recording paper. Cut sheets are used as recording paper. The cut sheets are enclosed in a sheet cassette 108 attached to the main body 100 and are picked up and fed one by one into the apparatus by a paper feed roller 109 and conveying rollers 110 and 111 and conveyed to the drum 106.

Figure 2:
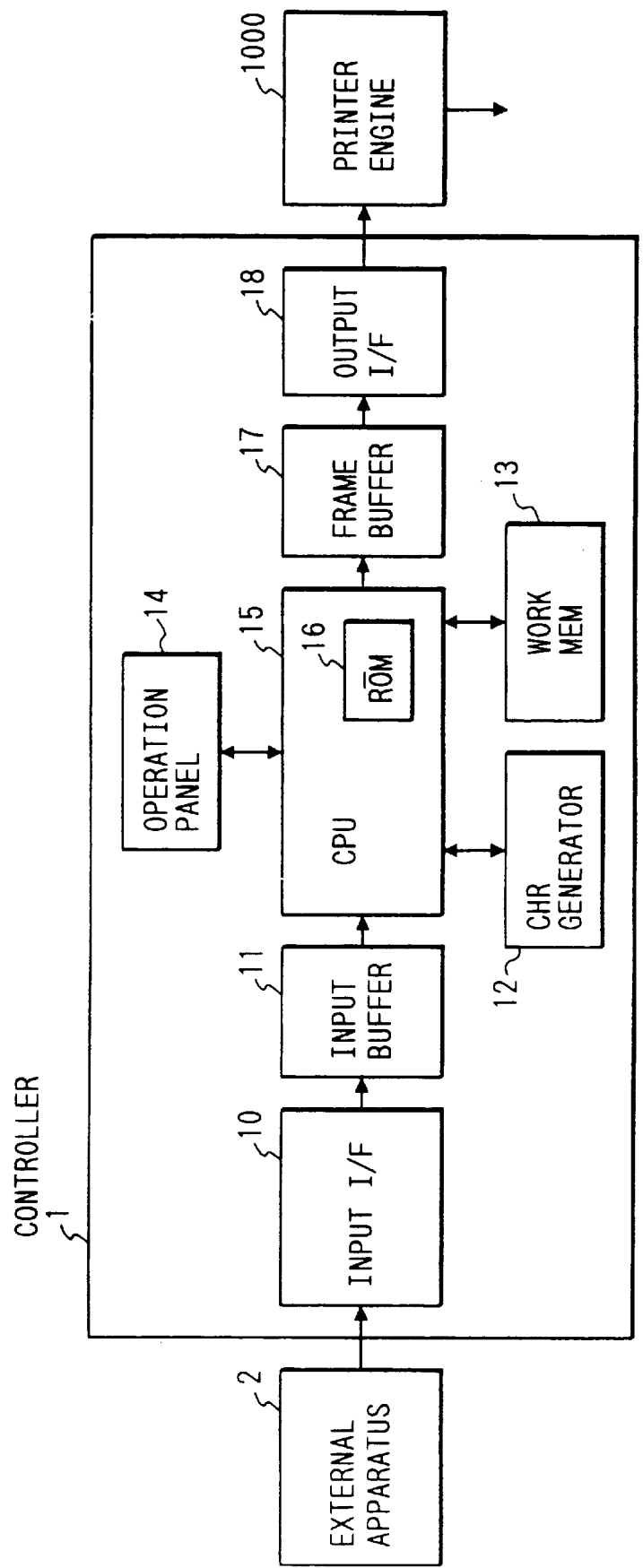
FIG. 2 is a block diagram for explaining a printer control system in the first embodiment.

FIG. 2 is a block diagram for explaining a construction of a printer control apparatus of the printing apparatus shown in FIG. 1.

In the diagram, reference numeral 1 denotes the controller (printer control unit) for controlling so as to receive input information such as character code, external character font, form information, macro registration information, and the like which were sent from the external apparatus 2 as a generation source of input information and to print output information or the like on a page unit basis. Reference numeral 10 denotes an input interface for inputting various kinds of information from the external apparatus 2; 11 an input buffer memory to temporarily store the various kinds of information which were input through the input interface 10; and 12 a character (CHR) generator. The CHR generator 12 includes an ROM in which character pattern information corresponding to ordinary text data or the like which was sent by a character code from the external apparatus 2, a read-out control circuit for the ROM, and the like and also has a code converting function such that when a character code is input, an address of the character pattern corresponding to the input character code is calculated.

Reference numeral 13 denotes a work memory of a CPU 15. The work memory 13 is constructed by an RAM and also stores an external character font, form information, and the like which were sent from the external apparatus 2. The work memory 13 is also used as a page buffer memory to store information of an amount corresponding to one page in the information which has once been stored in the input buffer memory 11. Reference numeral 14 denotes the operation panel to manually operate the controller 1. Reference numeral 15 denotes the CPU to control an entire control system of the printer. The CPU 15 controls the entire apparatus in accordance with a control program of the CPU 15 stored in the ROM 16. Pattern information which was developed into a character pattern or the like is stored in a frame buffer 17 by at least an amount of one page in correspondence to a print image (output information). An output interface 18 generates a video signal corresponding to the pattern information from the frame buffer 17 and executes an interface control between the laser beam printer (LBP) main body 100 and the output interface 18. A printer engine 1000 receives the video signal from the output interface 18 and prints the image information based on the video signal.

Figure 3:
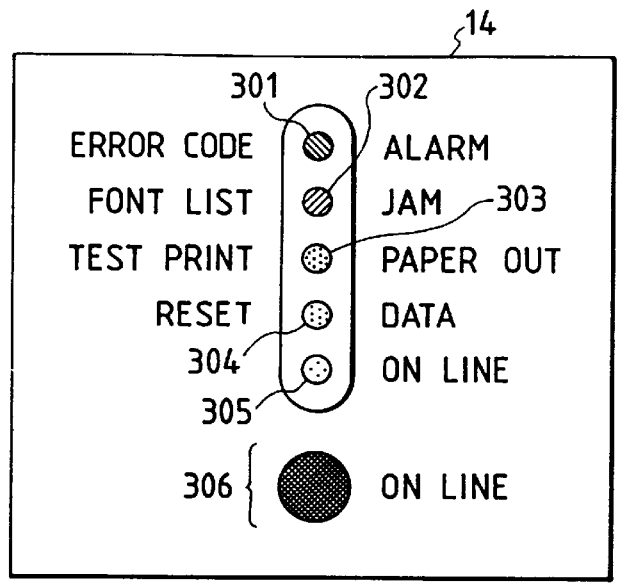
FIG. 3 is an enlarged plan view of a main section for explaining a construction of an operation panel 14 shown in FIG. 2.

FIG. 3 is an enlarged plan view of a main section for explaining a construction of the operation panel 14 shown in FIG. 2. The operation panel 14 is constructed by five LEDs and one switch but doesn't have a character display unit (LCD) to display various kinds of messages or the like and a buzzer.

In the diagram, reference numerals 301 to 305 denote monochromatic LEDs for ordinarily showing various kinds of states of the printer. Particularly, the LED 301 functions as an ALARM display which is turned on when an error occurs due to a cause on the user side. The LED 302 functions as a JAM display which is turned on when a paper jam occurs. The LED 303 functions as a PAPER OUT display which is turned on when a paper out (no paper) occurs. The LED 304 functions as a DATA display indicative of the presence or absence of input information. The LED 305 functions as an ON LINE display indicating whether the printer is in an information receivable state or not. Reference numeral 306 denotes a single key for generally switching between the ON LINE state and the OFF LINE state by a toggle operation. The functions in the ordinary state of the LEDs will now be specifically explained hereinbelow.

Although there are five LEDs in the printer according to the embodiment, their functions differ in the ordinary state and a special operation mode. The function of each LED in the ordinary state will now be described.

(1) ALARM LED 301 (ordinary mode)

The LED is turned on in the case where various kinds of errors occur in the printer and the printing operation of the printer cannot be continued. In the case where the LED is turned on, the printer automatically enters the OFF LINE state (namely, the ON LINE LED 305 is turned off).

(2) PAPER JAM LED 302 (ordinary mode)

The LED is turned on when a paper jam occurs in the printer. The LED is also turned on when the door is open. When the LED is turned on, the printer automatically enters the OFF LINE state (namely, the ON LINE LED 305 is turned off).

(3) PAPER OUT LED 303 (ordinary mode)

The LED performs a display regarding a request of the papers.

ON: indicates a request of the paper feed to a cassette which is selected at present at a paper feed port or indicates a request of the exchange of the paper (size).

Flickering: indicates a request of the paper feed to a manual feeder which is selected at present at the paper feed port.

The discrimination about the presence or absence of the papers is performed always in case of using a sheet cassette and is executed just before the paper feed in case of the manual feeder. In the case where the LED is turned on and flickers, the printer automatically enters the OFF LINE state (namely, the ON LINE LED 305 is turned off).

(4) DATA LED 304 (ordinary mode)

The LED displays an operating state of the printer.

OFF: indicates that no input information exists in the printer

ON: indicates that input information exists in the printer and the printer is in an idling state Flickering: indicates that the printer is operating (input information is being processed)

(5) ON LINE LED 305 (ordinary mode)

The LED is turned on in the ON LINE state, is turned off in the OFF LINE state, and flickers during the state shift processing.

Each of the LEDs 301 to 305 enters a special operating mode on the basis of the operation of the key 306, which will be explained hereinlater.

The functions of the special operating mode of each LED and the key 306 will specifically be explained hereinafter.

(6) ERROR CODE LED 301 (special mode)

The LED flickers in case of selecting an error code display.

(7) FONT LIST LED 302 (special mode)

The LED flickers in case of selecting a font list output.

(8) TEST PRINT LED 303 (special mode)

The LED flickers in case of selecting a test print output.

(9) RESET LED 304 (special mode)

The LED flickers in case of selecting a soft reset.

(10) ON LINE SWITCH KEY 306

This switch has the following functions.

1) By pressing the switch for a short time, the switching between the ON LINE state and the OFF LINE state can be performed (toggle key).

The ON LINE state denotes a state in which the printer can perform a printing operation in accordance with the information input from the outside (host computer). On the other hand, the OFF LINE state denotes a state in which the printer doesn't accept any print data from the outside and the printer is solely closed.

When shifting from the ON LINE state to the OFF LINE state, there is a case where the ON LINE LED 305 flickers. This means that the printer is shifting to the OFF LINE state (namely, a paper delivery waiting state of the paper during the printing or conveying operation). After the paper was delivered, the printer enters the OFF LINE state.

2) When the printer is in a sleep mode due to an automatic LED turning-off function, by pressing the switch for a short time, the apparatus can be shifted to another mode from the sleep mode.

3) By pressing the switch for a short time when the exchange of the paper is requested or when an error occurs, the error can be skipped.

4) By continuous pressing the switch for a predetermined time, for example, two or more seconds in the OFF LINE state, the printer can enter the special mode.

In the special mode, by operating the switch, the following functions can be executed.

1. execution of a soft reset
2. output of a test print
3. output of a font list
4. display of error code 5) By pressing the switch for a short time during the output of a test print and a font list, the test can be stopped (however, the printer is set to the OFF LINE state after all of the test patterns which had been formed so far were output).

That is, when the LEDs 301 to 305 enter the special mode, each LED displays a state indicative of another meaning mentioned above.

In the embodiment, the key 306 also functions as instructing means for instructing the switching the display mode of the LEDs 301 to 305 to the special mode. In the embodiment, the CPU 15 judges whether, for example, the key 306 has continuously been depressed for two or more seconds or not, and the switching of the display mode is controlled in accordance with flowcharts, which will be explained hereinbelow.

In the printer control apparatus with such a construction as mentioned above, a key input state by the key input means (key 306) is monitored and when the switching means (CPU 15) switches the display mode of each display means (LEDs 301 to 305) to a printer resource display mode (special mode), the control means (CPU 15) controls the start of either one of the printer resource display processings which were allocated to the display means which are sequentially turned on in accordance with the key input state by the key input means after completion of the switching instruction. Therefore, even by a small number of key input means and display means, many printer resource display modes (special modes) can be certainly set and their states can be confirmed.

Figure 4:
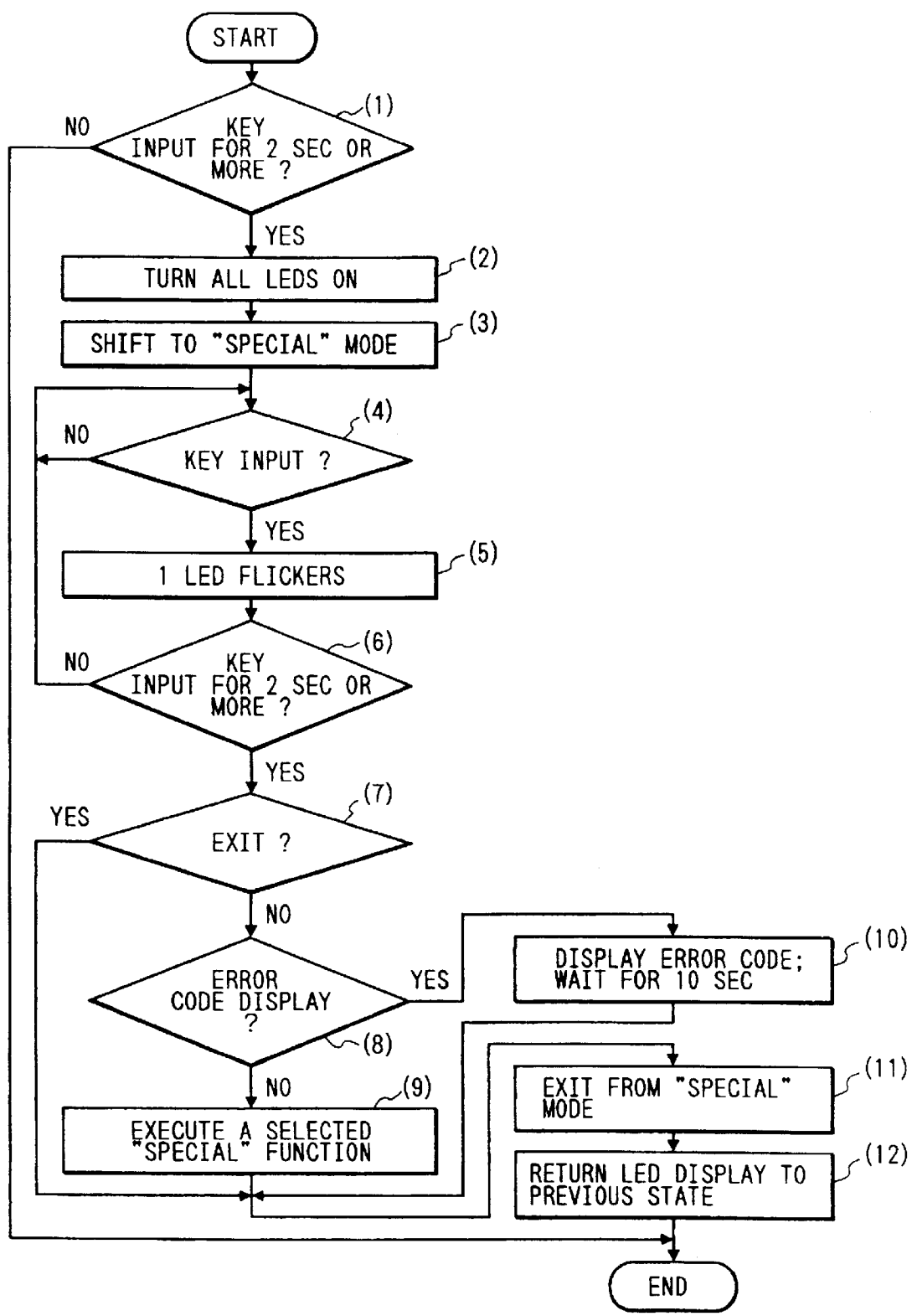
FIG. 4 is a flowchart showing an example of a special operating mode processing procedure in a printer control method according to the first embodiment.

FIG. 4 is a flowchart showing an example of a processing procedure of the printer resource display mode (special mode). Reference numerals (1) to (12) denote processing steps. First, the printer is set into the OFF LINE state by the ordinary panel operation.

This processing routine is started when the key 306 is depressed. First, a check is made to see if the key 306 has been depressed, for example, for two seconds or more or not (1). If NO, the processing routine is finished without executing any processing.

Figure 5:
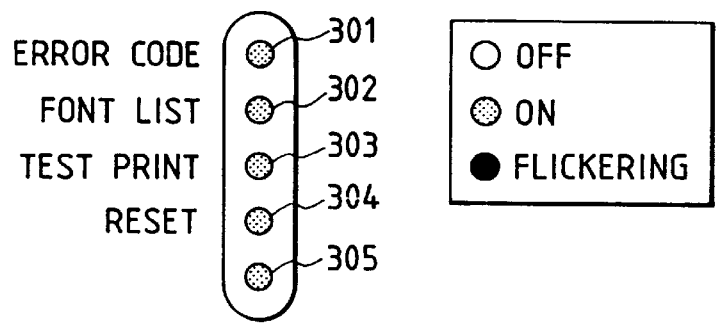
FIG. 5 is a diagram showing a special operating mode shift state according to the first embodiment.

If YES in step (1), all of the LEDs 301 to 305 on the operation panel 14 are turned on as shown in FIG. 5 (2), thereby informing the user of the fact that the printer was shifted to the printer resource display mode (special mode).

In general, when the user confirms that all of the LEDs were turned on, the user releases the switch key 306.

Figure 6:
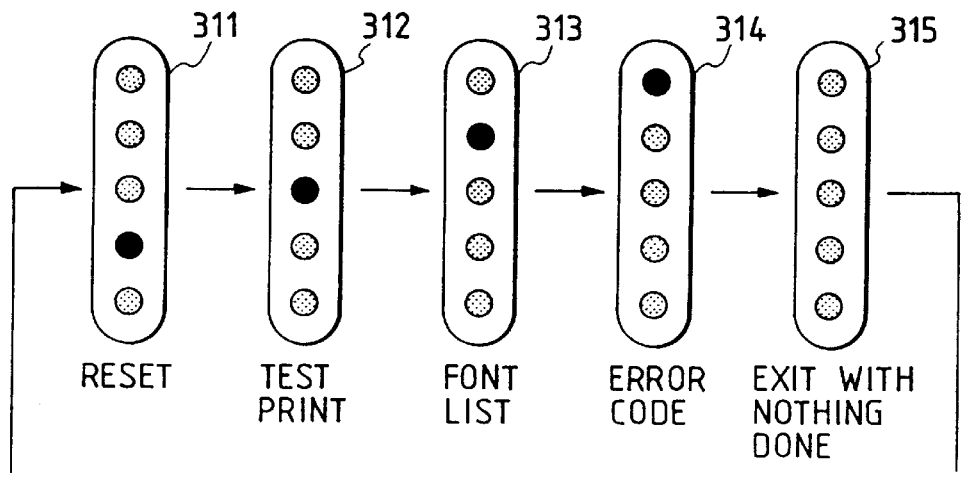
FIG. 6 is a diagram showing a special operating mode display transition according to the first embodiment.

A processing to shift to the printer resource display mode (special mode) is subsequently executed (3). The depression of the kelp 306 is once stopped. After that, when the key 306 is depressed for a short time (4), as shown in FIG. 6, the LED 304 flickers (present printer resource displaying function selection candidate) (refer to 311 in FIG. 6) and the four remaining LEDs are turned on and, each time the key 306 is depressed for a short time, the LEDs 303, 302, and 301 sequentially flicker while being switched (refer to 312 to 314 in FIG. 6) (5). The operating modes in the states 311 to 314 in which the LEDs 304, 303, 302, and 301 flicker are a reset processing (RESET), a print of a list of automatic environment (TEST PRINT), a print of a list of fonts (FONT LIST), and a display of an error code (ERROR CODE). A state in which all of the LEDs 301 to 305 are turned on (refer to 315 in FIG. 6) indicates a state in which nothing is executed. That is, during the special mode, the LED which flickers (at a high speed) each time the switch key 306 is once depressed changes as mentioned above and the LED indicative of the function to be selected and executed from now on flickers.

When the key input is continuously executed for two seconds or more after the mode was shifted to the LED display indicating the printer resource display function to be executed, the LED flickering time changes and its function is selected and executed (6). If the processing routine advances without performing any processing, namely, in case of the state 315 shown in FIG. 6 (7), no printer resource display function is executed and the printer progresses to another processing from this mode. That is, after the apparatus was set to a state in which the LED of a desired function flickers (at a high speed), when the switch key 306 is continuously depressed for, for example, two or more seconds, a flickering interval of the LED becomes slow (for instance, changes from about 200 msec to about 400 msec), thereby indicating that the desired function was selected. By releasing the switch which was continuously being depressed, the selected function is executed.

In the case where the display of the detailed error information is subsequently selected (8), namely, when the state 314 shown in FIG. 6 is established, the processing routine advances to step (10), the practical contents of the error which occurred are encoded and displayed by a combination of ON/OFF states of all of the LEDs 301 to 305 in accordance with the contents of the error. After displaying for ten seconds, the apparatus exits from the printer resource display mode. on the other hand, if NO in step (8), the selected printer resource display function is executed (9). For example, in case of printing a list of print environment (TEST PRINT), when the LEDs 301 to 305 are in the display state 312, a state in which the function of the state 312 was selected is continued during the execution of the printing and, after completion of the processing, the apparatus exits from the printer resource display mode (11). Subsequently, the display states of all of the LEDs 301 to 305 are returned to the states before shifting to the printer resource display mode (12) and, after that, the processing routine is finished.

The foregoing step (10) will now be specifically explained hereinbelow.

When various kinds of errors occur, the ALARM LED 301 is turned on and the printer is automatically set into the OFF LINE state. By depressing the ON LINE switch key 306 (for a short time) in this state, an error skip is soon executed.

However, after the errors occurred, when the printer enters the special mode and this function is executed, an error code is displayed by the LED and the contents of the errors can be known. An operating method will now be described hereinbelow.

In the special mode, when the ON LINE switch key 306 is continuously depressed for, for example, two seconds in a state in which the ERROR CODE LED 301 flickers (at a high speed), the LED flickers at a low speed. By releasing the switch in this instance, the error code is displayed. The error code is displayed by a combination of ON/OFF states of all of the LEDs. For example, after the error code was displayed for ten seconds, the printer exits from the special mode and is returned to the error generating state.

When the ON LINE switch is depressed (for a short time) during the error code display (for ten seconds), the printer immediately exits from the special mode and is returned to the error generating state.

FIG. 7 is a diagram showing an example in which the practical contents of errors are encoded by a combination of the ON/OFF states of all of the LEDs 301 to 305 mentioned above and are displayed.

Figure 8:
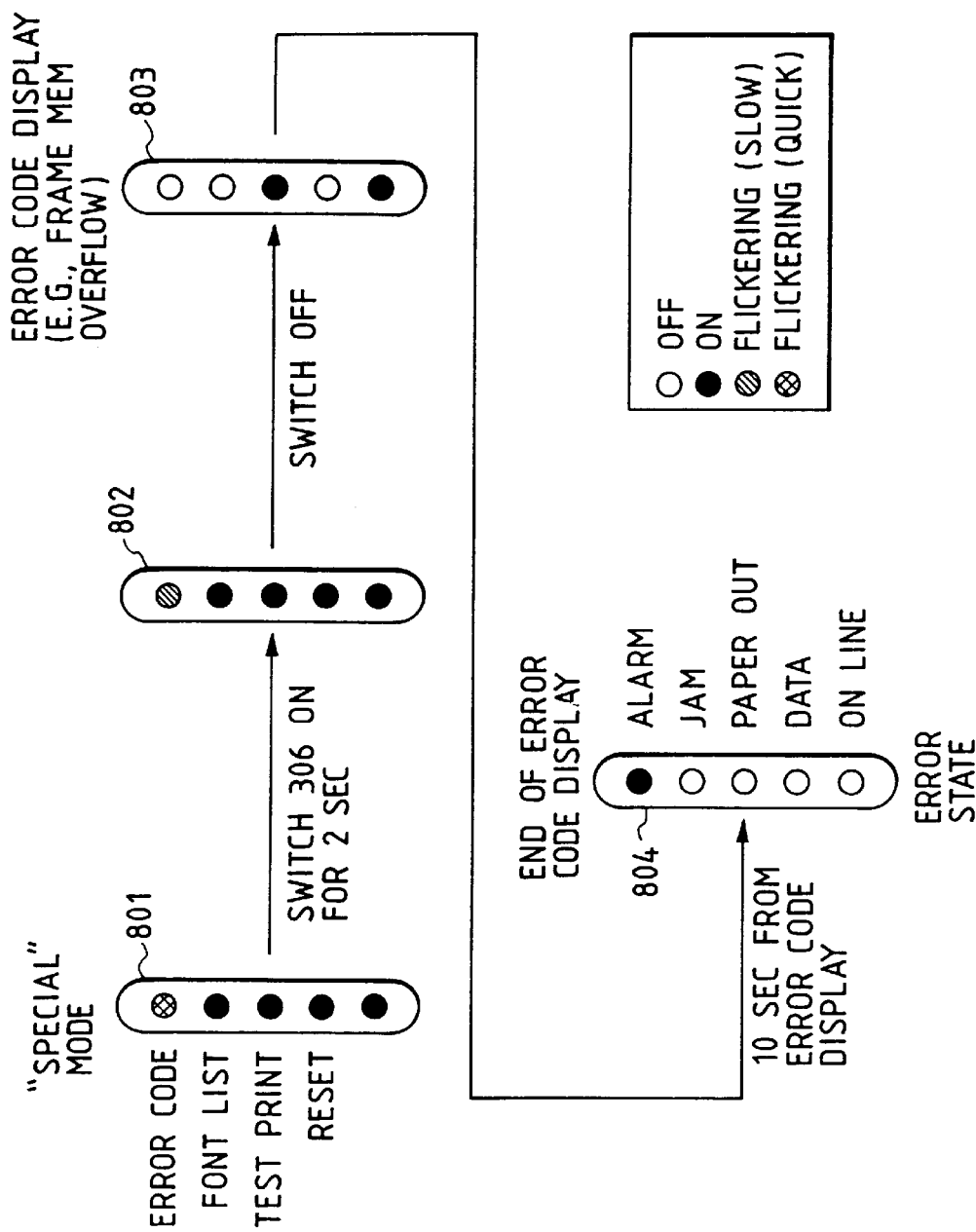
FIG. 8 is a diagram showing an example of an error code display transition in a special operating mode.

FIG. 8 is a diagram showing an error code display procedure in the case where the frame buffer memory 17 overflows. In the special mode, when the ON LINE switch key 306 is continuously depressed for, for example, two seconds in a state in which the ERROR CODE LED 301 flickers (at a high speed) (801), the LED flickers at a slow speed (802). By releasing the switch in this instance, the error code (error code shown by No. 8 in FIG. 7) is displayed (803). After the elapse of, for example, ten seconds after the error code had been displayed, the apparatus is returned to the error generation state (804).

In the first printer control method as mentioned above, the depressing state of a predetermined key 306 is monitored, the switching from the display modes of a plurality of displays allocated to a predetermined printer state alarm to the printer resource display mode is instructed in accordance with the depression time, and after completion of the switching instruction, either one of the printer resource display processings allocated to the displays which are sequentially turned on is started in accordance with the depression instruction state of the key. Therefore, many printer resource display modes can be certainly set and their states can be confirmed even by a small number of key input means and display means.

According to the second printer control method, after completion of either one of the printer resource display processings allocated to the displays which are sequentially turned on by an instruction to depress the key 306, the switching to the ordinary display mode is controlled, so that the apparatus can be certainly returned to the ordinary mode by a simple key input instruction.

In the embodiment, the numbers of LEDs and keys are not limited to those shown in the embodiment. The number and contents of functions which can be performed during the printer resource display mode are also not limited to those shown in the embodiment. Further, the display section is also not limited to the LED but any other display device can be also used. Further, although explanation has been made with respect to the case of applying the invention to the laser beam printer as a printing mechanism, the invention can be also easily applied to a printing apparatus having another print mechanism section a dot matrix printer, an ink jet printer, or the like. Although the embodiment has been described with respect to the case of displaying the operating mode state in either one of the ON, flickering, and OFF of the LEDs 301 to 305, in case of constructing by using an LED which can be displayed by a back light, further larger number of operating modes can be displayed in accordance with the number of back light colors.

Second Embodiment

Figure 9:
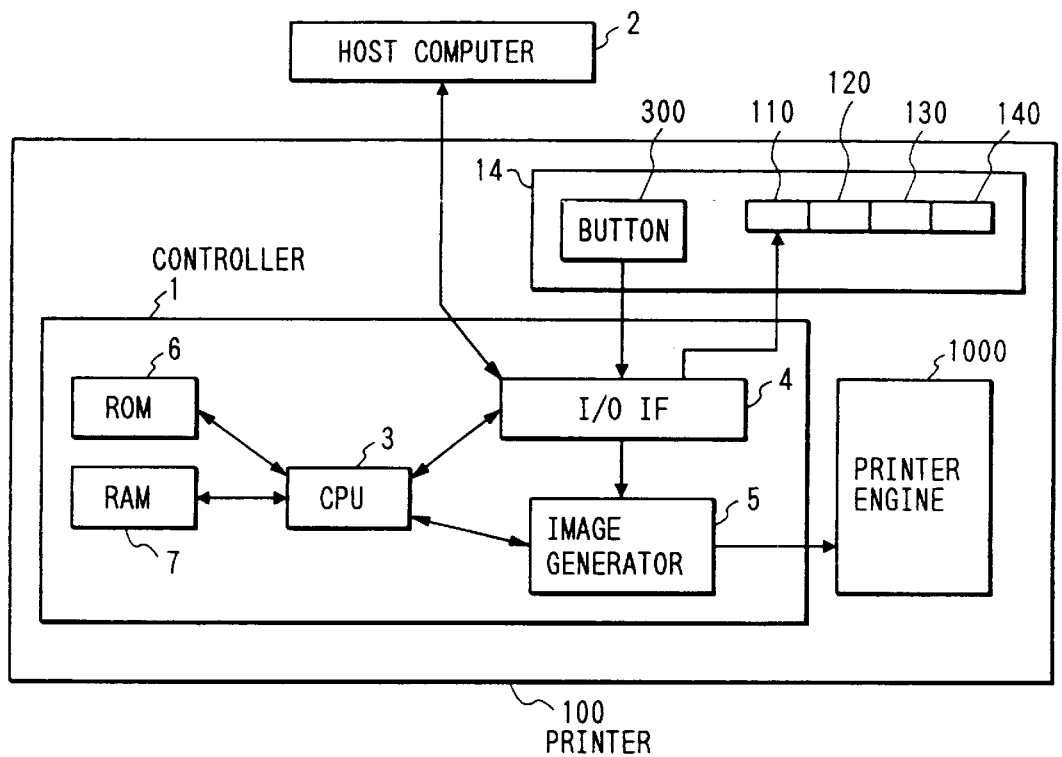
FIG. 9 is a block diagram for explaining a printer control system according to the second embodiment of the invention.

FIG. 9 is a block diagram for explaining a construction of a printing apparatus showing the second embodiment of the invention.

In the diagram, reference numeral 100 denotes the printer shown and described in FIG. 1. The printer 100 is connected to the host computer 2 and has the printer engine 1000 for analyzing the received input information and printing. A control program to execute a mode (test printing mode) to print an internal set state has been stored in an ROM 6 of the printer 100.

Figure 10:
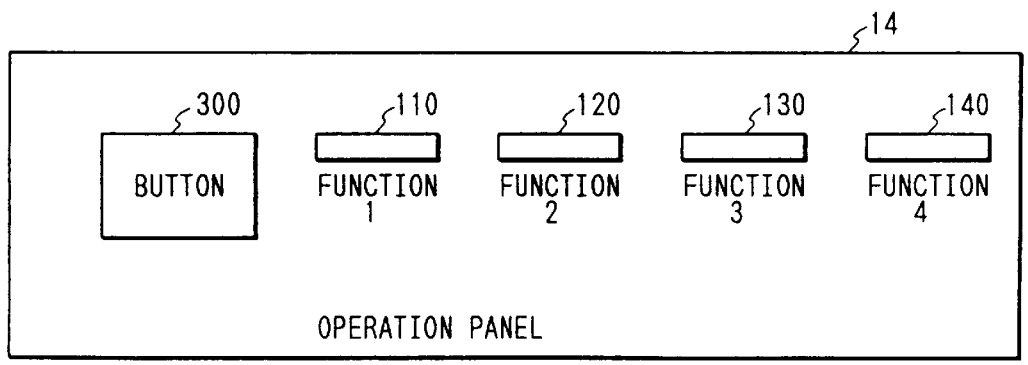
FIG. 10 is a diagram showing an example of an operation panel unit 14 in the second embodiment.

Reference numeral 3 denotes a CPU for controlling data communication with the host computer 2 and also integratedly controls each section of the printer 100 on the basis of the control program in the ROM 6 in which control procedures or the like shown in flowcharts of FIGS. 11, 12, and 14, which will be explained hereinlater have been stored. Reference numeral 300 denotes a button to accept commands from the user. As shown in FIG. 10, the button 300 is arranged on the operation panel 14 on the front surface side of the printer 100. The printer 100 has a non-volatile RAM (NVRAM) to store various kinds of set mode information.

Reference numeral 4 denotes an input/output interface for receiving input information from the host computer 2 and a signal from the button 300. Reference numeral 5 denotes an image generator to generate an image to be output (printed or displayed) from the input information. A program for discriminating whether the button 300 of the operation panel 14 is ON or OFF, a program to control the turn on/off of the LED in the operation panel 14, a program to interpret and print the input information from the outside, fonts which are used to print a character, and the like have been stored in the ROM 6. Reference numeral 7 denotes an RAM to store the internal set state or operating state of the printer 100 or to temporarily store information which is necessary for the control of the CPU 3.

FIG. 10 is a diagram showing an example of the operation panel 14 which is arranged in the printer 100 shown in FIG. 9 and the same portions as those in FIG. 9 are designated by the same reference numerals.

In the diagram, reference numerals 110 to 140 denote LED displays. In accordance with flowcharts, which will be explained hereinlater, as a result of the judgment of the depressing state of the button 300, the LED display 110 is turned on when it is judged that the instruction is a reset function instruction, the LED display 120 is turned on when it is judged that the instruction is a test print function instruction, the LED display 130 is turned on when it is judged that the instruction is an NVRAM initialization instruction, and the LED display 140 is turned on when it is judged that the instruction is a cancel function (instruction to exit from the special display mode to the ordinary mode), respectively. Explanations (for example, functions 1 to 4 or the like) to indicate their functions have previously been written near the arranging positions of the LED displays 110 to 140 in the operation panel 14 of the embodiment, respectively.

In the embodiment 2 in the printer with the construction as mentioned above, while the CPU 3 displays that the mode is being switched to the special display mode by the button

300 by changing display styles of the LED displays 110 to 140, a depressing state of the button 300 is judged. The CPU 3 sequentially displays the LED displays 110 to 140 arranged in correspondence to the special functions as special function selection candidates by a display style different from the ordinary display, judges the depressing state of the button 300 during the display of the special function selection candidates, and executes the special modes corresponding to the special function selection candidates which are being displayed. Therefore, the display of the candidates of a plurality of special modes which can be selected and the special modes can be executed by the button 300 and the LED displays 110 to 140.

In the embodiment 2 in the printer constructed as mentioned above, while the CPU 3 displays that the mode is being switched to the special display mode by the button 300 by changing the dis;)lay styles of the LED displays 110 to 140, the depressing state of the button 300 is judged and the CPU 3 sequentially displays the LED displays 110 to 140 arranged in correspondence to the special function as special function selection candidates by a display style different from the ordinary display. The depressing state of the button 300 during the display of the special function selection candidates is judged and the CPU 3 executes the special modes corresponding to the special function selection candidates which are being displayed. Or, the depressing state of the button 300 during the display of the special function selection candidates by the CPU 3 is judged and the CPU 3 cancels the identified special mode and returns to the display of the special function selection candidates by the LED displays 110 to 140. Therefore, the display of the candidates of a plurality of special modes which can be selected and the special modes can be executed by the button 300 and the LED displays 110 to 140. Even if the special mode is erroneously identified, the display mode can be returned to the special mode candidate display with a high fidelity.

Figure 11:
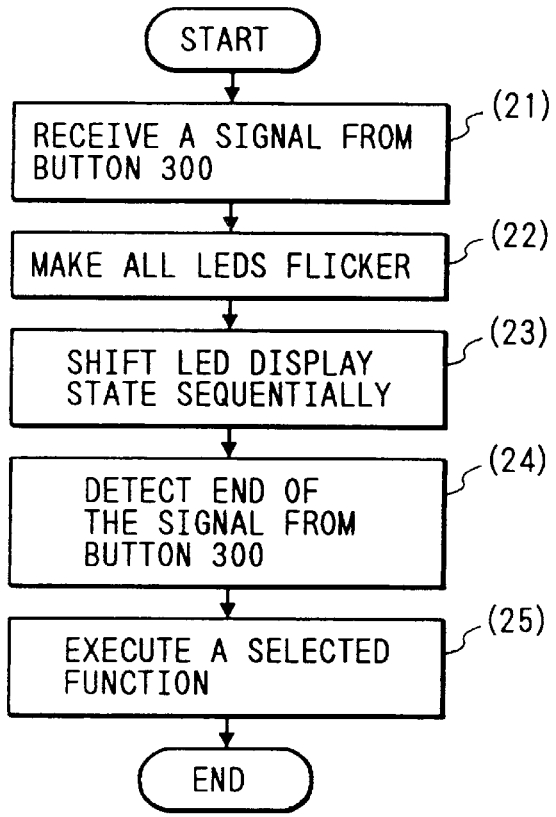
FIG. 11 is a flowchart showing an example of a special display mode switching display control procedure in the second embodiment.

FIG. 11 is a flowchart showing an example of a special display mode switching display control procedure in the printer according to the embodiment. Reference numerals (21) to (25) denote processing steps.

The CPU 3 is in a standby mode while monitoring an input of a key signal from the button 300. When the user detects that the user has continuously depressed the button 300 for a few seconds (21), the apparatus enters the special display mode. In order to inform the user of the fact that the operating mode was shifted to the special mode, all of the LED displays 110 to 140 to display the special display mode set states are allowed to flicker (22). Subsequently, the light-on of the LED displays sequentially starts to be moved (23). At a time point corresponding to the desired function, when it is detected that the user removes the hand from the button 300 (24), the function corresponding to the LED display which has been turned on at the time point when the depression of the button. 300 was stopped, namely, the function selected by the user is executed (25), and the processing routine is finished. In step 21 mentioned above, the CPU 3 detects the continuous input of the key signal from the button 300. In step 24 mentioned above, the CPU 3 detects the stop of the key signal input from the button 300.

Due to this, for example, in case of performing a test print corresponding to the function 2 (LED display 120) shown in FIG. 10, the flickering of all of the LED displays as a confirmation of a change to the special display mode is confirmed while the button 300 is depressed for a few seconds or more and the LED displays sequentially start to flicker. A test print function as a desired function is executed. If the apparatus unexpectedly enters the special function mode, by selecting the function 4 as a cancel function, the apparatus can exit from the special display mode.

In the embodiment, the depressing time of the button 300 has been set to a few seconds. However, the depressing time is not limited in particular. A depressing time can be also set to a proper time. In the embodiment, the case where all of the LED displays flicker in case of displaying the shift to the special display mode has been described. However, it is also possible to display so that the shift to the special display mode can be discriminated, for example, the LED displays 110 and 130 or the LED displays 120 and 140 can alternately flicker. Or, all of the LED displays can be held in the ON state for a little while, or the like.

Further, although the embodiment has been described with respect to the case where the automatic movement display in step (23) is sequentially turned on from the LED display 110 which is arranged on the leftmost side of the panel display 14, the moving direction can be also controlled so as to sequentially turn on from the LED display 140 which is arranged on the rightmost side.

Although the embodiment has been described with respect to the special display mode set display control in the display panel on which the LED displays are arranged in the lateral direction, the LED displays can be also arranged in the direction perpendicular to the plane at which the printer 100 is installed as shown in FIG. 3 which has been described in the embodiment 1. Further, the number of kinds of special display modes is not limited to the functions 1 to 4 shown in the embodiment but can be also set to other special display modes. The number of kinds is also not limited to four. Further, if the LED display can display different colors by the backlight colors, a further larger number of special display modes can be displayed. The embodiment has been described with respect to the case where, when the movement of the turn-on of the LED displays is started and the LED display at a desired function position is displayed, by stopping the depression of the button 300, the special function corresponding to the LED display which was turned on is automatically started. However, as will be explained hereinlater, it is also possible to control in a manner such that after the depression of the button 300 was stopped, an instruction of the confirmation of the user is promoted, thereby enabling the relevant selecting function to be specified or cancelled.

Third Embodiment

FIG. 12 is a flowchart showing an example of a special display mode switching display control procedure in the printer according to the embodiment 3. Reference numerals (31) to (39) show processing steps.

First, the CPU 3 is in a standby mode while monitoring the input of a key signal from the button 300. When the user continuously depresses the button 300 for a few seconds, the continuous key signal input from the button 300 is detected (31) and the apparatus is shifted to the special display mode. In order to inform the user of the fact that the apparatus is shifted to the special display mode, all of the LED displays 110 to 140 to display the special display mode set state are allowed to flicker (32). The turn-on of the LED display automatically starts to move from the LED 110 (33). At a time point corresponding to a desired function, when the user removes the hand from the button 300, the stop of the key signal input from the button 300 is detected (34). Subsequently, the LED display corresponding to the selected function is allowed to flicker (35). A check is made to see if the function is a desired function or not (36). If YES, the user again depresses the button 300, thereby detecting the key signal input from the button 300 (37) and specifying the selection of the relevant function and the selected special function is executed (38). The processing routine is finished.

On the other hand, if NO in step (36), namely, when the function which is not a desired function is selected, for example, by continuously depressing the button 300 for a few seconds by the user, the continuous key signal input from the button 300 is detected (39). The processing routine is returned to step (33) and the function selection is repeated.

Due to this, for example, in the case where a test print corresponding to the function 2 is executed, a state in which all of the LED displays flicker and which indicates a confirmation of the change to the special display mode is confirmed while inputting the key signal from the button 300 for a few seconds or more. The LED displays sequentially start to flicker. When the key signal input from the button 300 is stopped for the first time when the LED display 120 corresponding to the test print as a desired function is turned on, the LED display 120 flickers. When the key signal from the button 300 is again input, the test print function processing is started. If the LED display 130 or the like is erroneously selected, the continuous key signal from the button 300 is again input for a few seconds or more, the LED displays are again sequentially allowed to flicker, and the key signal input from the button 300 is stopped, so that the special display mode can be again selected. In addition to it, if the apparatus unexpectedly entered the special function mode, by ,.electing the LED display 140 as a cancel function, the apparatus can exit from the special display mode.

Fourth Embodiment

Figure 13:
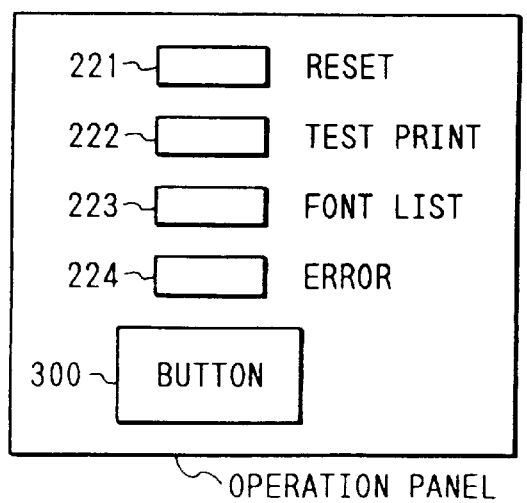
FIG. 13 is a diagram showing an example of an operation panel unit 14 in the fourth embodiment.

FIG. 13 is a diagram showing an example of the operation panel 14 which is arranged in the printer 100 shown in FIG. 9. The same portions as those shown in FIG. 9 are designated by the same reference numerals.

In the diagram, reference numerals 221 to 224 denote LED displays. As a result of that the depressing state of the button 300 was detected in accordance with flowcharts, which will be explained hereinlater, the LED display 221 flickers when it is judged that an instruction is a resetting function instruction, the LED display 220 flickers when it is judged that the instruction is a test print function instruction, the LED display 230 flickers when it is judged that the instruction is a font list instruction, and the LED display 240 flickers when it is judged that the instruction is an error function instruction (to output the contents of the errors), respectively. In the operation panel 14 of the embodiment, descriptions (for examples, functions 1 to 4 or the like) to instruct the respective functions have previously been written at positions near the arranging positions of the LED displays 221 to 224.

FIG. 14 is a flowchart showing an example of a special display mode switching display control means in the printer according to the embodiment. Reference numerals (41) to (54) denote processing steps.

First, in the off line state (41), the CPU 3 is in a standby mode to wait for the input of a key signal from the button 300. When the user continuously depresses the button 300 for a few seconds, the continuous key signal input from the button 300 is detected (42) and the apparatus is shifted to the special display mode. In this instance, all of the LED displays 221 to 224 are turned on (43) in order to clarify that the operating mode was shifted to the special display mode. The user removes the hand from the button 300 and stops the depressing state, so that the stop of the key signal input from the button 300 is detected (44). At this time point, the user again continuously depresses the button 300 for a few seconds, thereby detecting the key signal input from the button 300 (45). The processing routine is returned to step (41) and the apparatus is set to the off line state.

On the other hand, when the user clicks the button 300 without continuously depressing the button 300 for a few seconds after step (44), the temporary input of the key signal is detected (46) and the LED display 240 flickers (47). When the user clicks the button 300 until the LED display of a desired function flickers, the temporary input of the key signal is detected (49). A check is made to see if the number of clicks is equal to [(the number of functions)+1] or not (51). If YES, the processing routine is returned to step (43) in order to turn on all of the LED displays 221 to 224 without flickering the LED display.

On the other hand, if NO in step (51), the LED displays 221 to 224 are sequentially allowed to flicker each time the button 300 is clicked (53). The processing routine is returned to step (47).

In the state of step (47), when the continuous key signal input from the button 300 is detected in a flickering state of a desired LED display (48), the LED display is allowed to slowly flicker (50). Subsequently, when the stop of the key signal input from the button 300 is detected (52), the selected function is executed (54) and the function selection display process is finished.

Thus, for example, in the case where the user executes a test print, the printer is first set into the off line state by depressing the button 300 and the user continuously depresses the button 300 for a few seconds. Thus, since all of the LED displays 221 to 224 are turned on, the user confirms such a state and removes the hand from the button 300. Subsequently, by clicking the button 300, the LED display 224 first flickers. By further clicking the button 300, the LED display 223 flickers. By further clicking the button 300, the LED display 222 (test print function) flickers. By continuous depressing the button 300 for a few seconds, the LED display 222 further starts to slower than the flickering just before. The user confirms such a slow flickering state and removes the hand from the button 300. At this time point, the selected test print function process is started and a desired output of the user is obtained.

According to the special mode executing method which is used in the printer according to the invention shown in each of the flowcharts as mentioned above, the display styles of each or all of the LED displays are sequentially changed in accordance with the depressing state of the button 300, a plurality of special mode candidates which can be selected are displayed, the depressing state of the key input means during the display of the special mode candidates is judged, and either one of the special modes corresponding to all of the LED displays which were displayed as special mode candidates is executed on the basis of the discrimination result. Therefore, the display of a plurality of special mode candidates which can be selected and the special modes can be executed by the button 300 and all of the LED displays.

Fifth Embodiment

Figure 15:
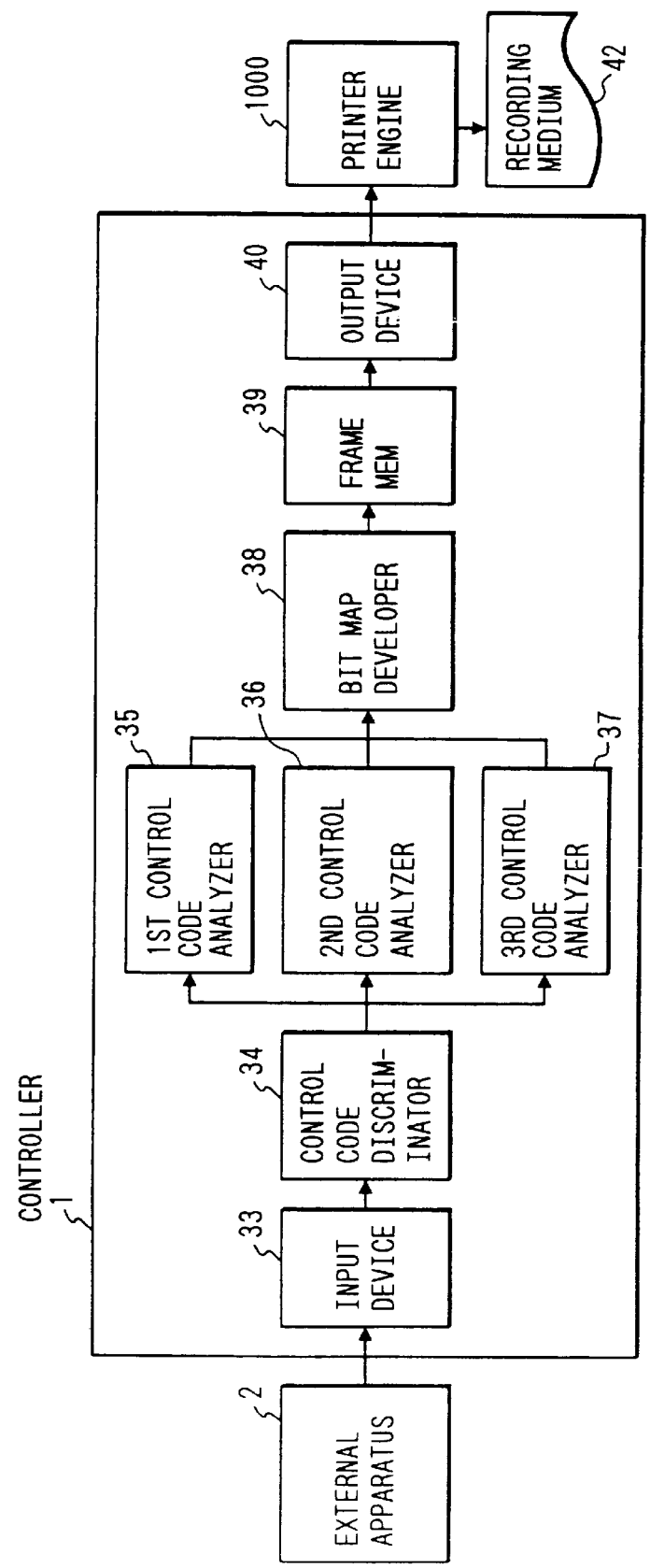
FIG. 15 is a block diagram for explaining a printer control system in the fifth embodiment.

FIG. 15 is a block diagram for explaining a construction of a printer control apparatus showing the fifth embodiment.

In the diagram, reference numeral 2 denotes an external apparatus such as a host computer or the like; 33 an input device to receive input data from the external apparatus 2; 34 a control code discriminator; 35 to 37 control code analyzers; 38 a bit map developer for developing bit map data into a frame memory 39 on the basis of analysis data which was output from the control code analyzers 35 to 37; and 40 an output device to transmit an output image developed in the frame memory 39 to a printer engine 41. The printer engine 41 records desired data onto a recording medium 42 on the basis of an output image which is transmitted from the output device 40. The output device 40 can also output the output image to a display device such as a CRT or the like (not shown).

First, the input data (comprising character code, control code, or the like) transferred from the external apparatus 2 is once stored into the input device 33. When an amount of data stored in the input device 33 reaches a predetermined reference value or after the elapse of a predetermined time or more after completion of the storage of the last data even if the data amount doesn't reach the reference value, the data stored in the input device 33 is sent to the control code discriminator 34.

The control code discriminator 34 judges to which one of the control code analyzers the control code in the input data corresponds. When the relevant control code analyzer exists, the input data is sent to either one of the control code analyzers 35 to 37. If it is judged that the relevant control code analyzer doesn't exist, the control code discriminator 34 executes a skip reading process of a series of subsequent data, thereby preventing the execution of the illegal printing.

The data which was analyzed by either one of the control code analyzers 35 to 37 is sent to the bit map developer 38. For example, an output image is formed in the frame memory 39 by, for example, a style of a bit map memory of one page. The output device 40 controls the ON/OFF operations of a laser beam for the printer engine 41 in accordance with the frame memory 39, thereby recording the print result to the recording medium 42 such as a paper or the like.

In the printer control apparatus constructed as mentioned above, a feature of the control code which was input from a data source (external apparatus 2) is compared with a feature of a predetermined control code which is analyzed by each analyzing means (control code analyzers 35 to 37). On the basis of the result of the comparison, the first control means (control code discriminator 34) controls the selection of either one of the analyzing means which can be used. The feature of the input control code is compared with the feature of the predetermined control code which is analyzed by each analyzer. On the basis of the comparison result, the second control means (which is also commonly realized by the control code discriminator 34) controls the skip reading process of the series of print information which is subsequently input. Therefore, even if print information which cannot be processed is received, the print information can be automatically abandoned.

The control code discriminator 34 in the embodiment executes a code discriminating process in accordance with the following three stages of discrimination standards and selects either one of the control code analyzers at a time point when each of the discriminating conditions is satisfied. Particularly, the first stage is the severest discrimination standard and the discrimination standard becomes gentle as the stage level progresses.

At the first stage, a control code which is peculiar to the relevant analyzer exists but doesn't exist in the other analyzers.

At the second stage, a predetermined number or more of certain control codes exist in the relevant analyzer although such a certain control code also exists in the other analyzers.

At the third stage, a control code which doesn't exist in the relevant analyzer doesn't exist.

A control code discrimination processing operation in the printing method according to the invention will now be described hereinbelow with reference to a flowchart shown in FIGS. 16A and 16B.

Figure 16A:
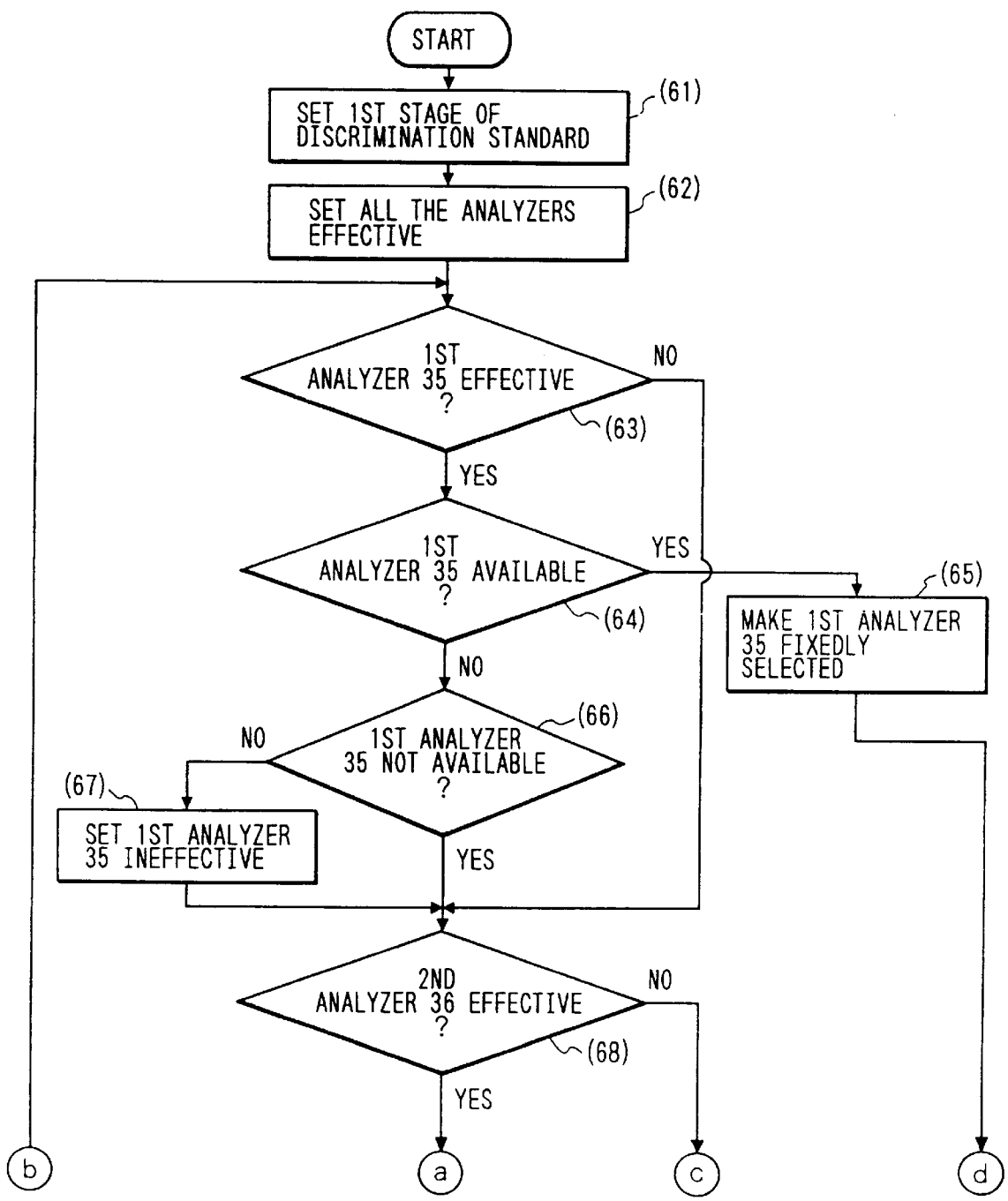
FIG. 16 is comprised of FIGS. 16A and 16B flowcharts showing an example of a control code discrimination processing procedure according to the fifth embodiment.
Figure 16B:
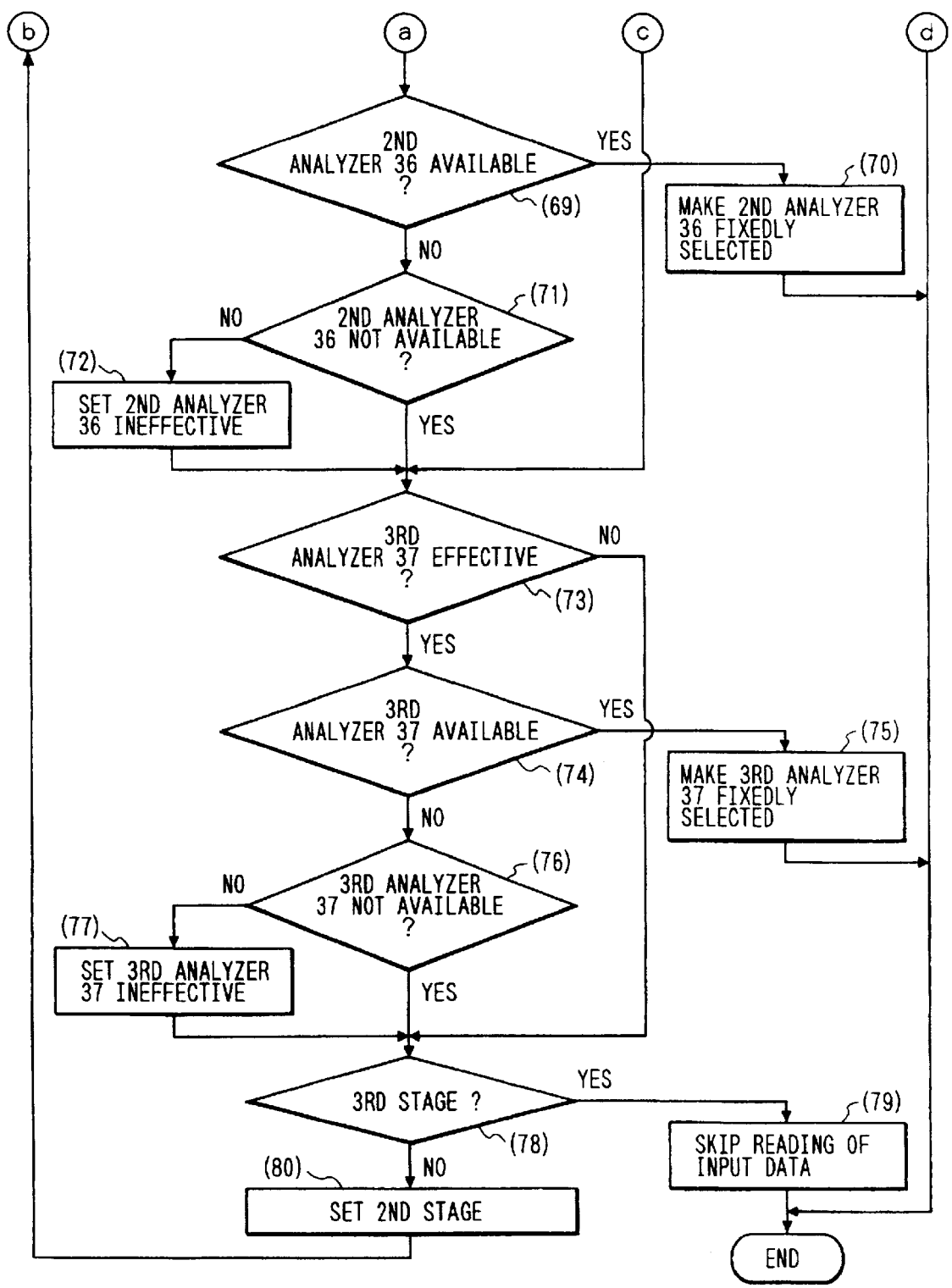

FIGS. 16A and 16B are the flowcharts showing an example of a control code discrimination processing procedure in the printer control method according to the invention. Reference numerals (61) to (80) denote processing steps.

In the control code discriminator 34, the judgment standard is first set to the severest first stage (61) and the discrimination processings of all of the analyzers are made effective (62). Subsequently, each of the control code discrimination processing at the first stage is sequentially executed in accordance with a preset analysis priority (in the embodiment, the priorities are set to be high in accordance with the order of the control code analyzers 35 to 37). In the judgment in step (63), the analysis processing of the control code analyzer 35 is effective because of the initial stage in this case. In step (64), a check is made to see if there is a feature that is peculiar to the control code of the control code analyzer 35 or not in accordance with the discrimination standard at the first stage. When it is judged that the code is a control code of the analyzer 35, step (65) follows and the analyzer 35 is decided and the processing routine is finished.

If NO in step (64), a checks is made to see if a control code which cannot be handled in the analyzer 35 exists or not (66). If YES in step (66), the discrimination processing of the analyzer 35 is made ineffective (67). After that, the discrimination processing of the analyzer 35 is inhibited at the second and third stages. In the case where the control code which cannot be handled in the analyzer 35 doesn't exist, the discrimination processing of the analyzer 35 at the first stage is finished and the processing routine advances to step (68) in order to shift to the discrimination processing of the analyzer 36.

Processes similar to those in the analyzer 35 are executed for the analyzers 36 and 37 in steps (68) to (78) after that. Even at this time point, when it is impossible to specify that the control code belongs to which one of the analyzers, th(e discrimination standard is changed to the second stage in step (80).

The discrimination processes at the second and third stages are executed in steps (63) to (78) in a manner similar to the first stage. At the previous stage, in the case where it has already been judged that the control code was not for the analyzer, the discrimination processing is not executed (63, 68, 73).

Due to this, since there is no need to execute the vain discrimination processing, the discrimination processing time can be reduced.

In the case where it is impossible to specify that the control code relates to which one of the analyzers even after completion of the discrimination processing at the third stage (78), namely, in the case where the control code which doesn't exist in all of the analyzers exists, the skip reading process of the input data is executed (79) and the processing routine is finished. The input data which is received during the skip reading process is not sent to any one of the control code analyzers but is abandoned. That is, by executing the data skip reading process, the illegal printing is prevented. During the skip reading process a message indicating that the skip reading process is being executed is displayed on the operation panel 14, thereby informing the user. The skip reading process is continued when no data is input to the same input interface for a predetermined time or more or until the data input interface is switched.

Figure 17:
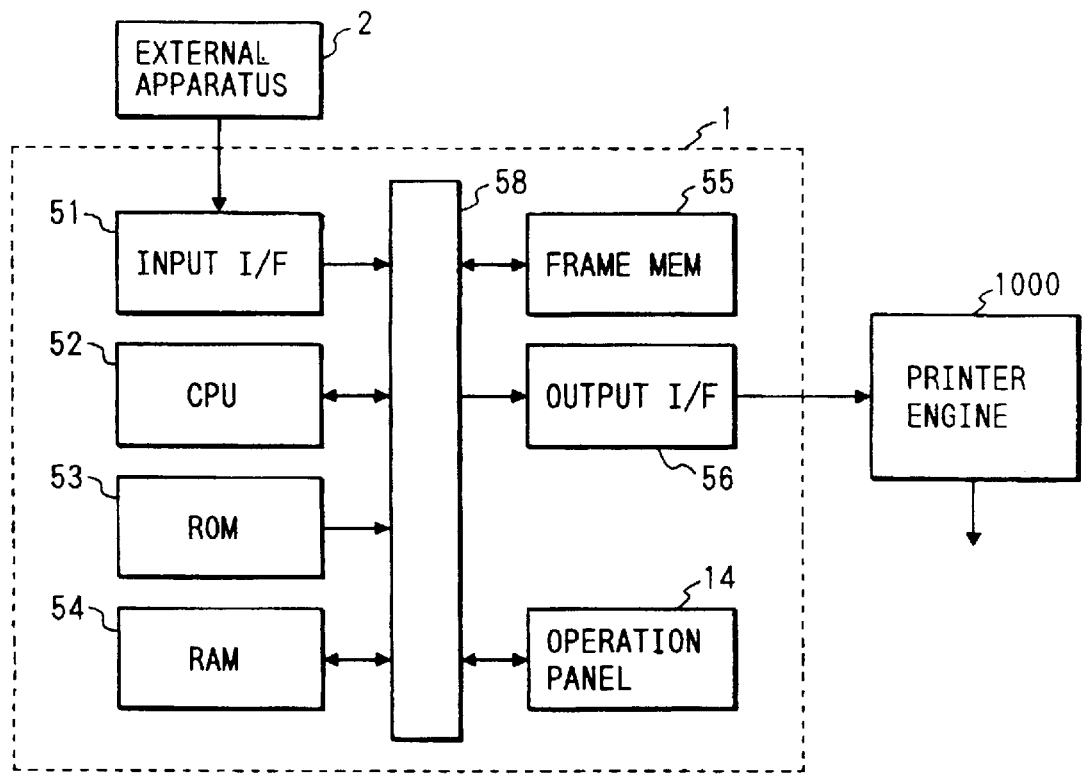
FIG. 17 is a block diagram for explaining a construction of a printer control system according to the fifth embodiment.
Figure 18:
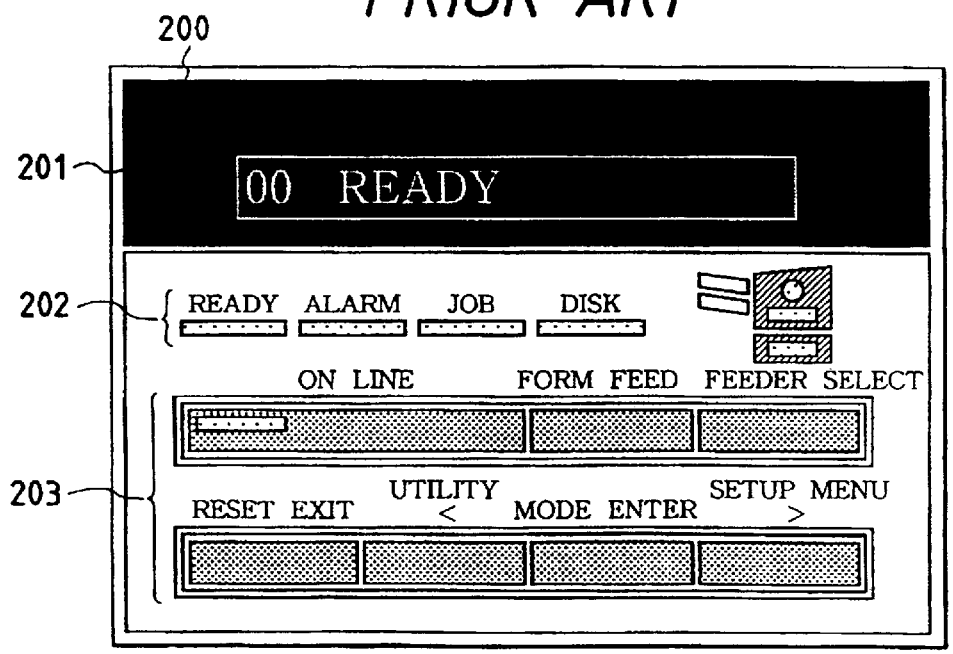
FIG. 18 is a plan view showing an example of an operation panel of a conventional printing apparatus.

FIG. 17 is a block diagram for explaining a construction of the printer control apparatus showing a practical construction of the fifth embodiment of the invention. The same portions as those shown in FIG. 15 are designated by the same reference numerals.

In the diagram, reference numeral 51 denotes an input interface for inputting input data from the external apparatus 2 such as a host computer or the like; 52 a CPU to control the entire printer engine 1000; 53 an ROM in which an operation processing procedure (including the procedure shown in the flowchart shown in FIGS. 16A and 16B) of the CPU 52 and character font patterns have been stored; and 54 an RAM which is used as a work area of the CPU 52, a reception buffer to store the input data which was received from the external apparatus 2, and a memory to store page data to construct an output image of one page from the received input data or the like. Reference numeral 55 denotes a frame memory which is constructed by an RAM and 56 indicates an output interface to output an output image 1to the printer engine 1000 to actually print. The above component elements are connected to a system bus 58. In the printer constructed as mentioned above, the CPU 52 executes an almost similar control code discrimination processing in accordance with the flowchart shown in FIGS. 16A and 16B mentioned above on the basis of a control program stored in the ROM 53. The code discrimination processing is completed in a short time.

Although the embodiment has been described with respect to an example of the case where the discrimination standards in the control code discriminator 34 has been set to three stages. However, the number of stages is not limited to three stages but can be set to an arbitrary number in the invention.

The control code analyzer and the control code discriminator corresponding to it are handled as one program unit and by freely combining it, a printer having an excellent expandability can be also easily provided.

A construction of an ink jet recording apparatus to which the embodiment is applied will now be described hereinbelow with reference to FIG. 7.

FIG. 19 is an external view for explaining a construction of another printer to which the invention can be applied. For example, FIG. 19 shows the case of an ink jet recording apparatus (IJRA).

In the diagram, a lead screw 5005 is rotated through driving force transfer gears 5011 and 5009 interlockingly with the forward/reverse rotation of a drive motor 5013. A carriage HC comes into engagement with a spiral groove 5004 of the lead screw 5005 and has a pin (not shown). The carriage HC is reciprocated in the directions of arrows a and b. An ink jet cartridge IJC is installed in the carriage HC. A paper pressing plate 5002 presses a paper onto a platen 5000 in the carriage moving direction. Reference numerals 5007 and 5008 denote photocouplers which function as home position detecting means for confirming the existence of a lever 506 of the carriage HC in those regions of the photocouplers and for performing the switching of the rotating direction of the drive motor 5013 or the like. Reference numeral 5016 denotes a member to support a cap member 5022 to cap the entire surface of a recording head; 5015 sucking means for sucking the air in the cap and for executing a sucking recovery of the recording head through an opening 5023 in the cap; 5017 a cleaning blade which can be moved in the front and back directions by a member 5019; 5018 a main body supporting plate to support the cleaning blade 5017 and member 5019; and 5012 a lever for starting the sucking operation of the sucking recovery. The lever 5012 is moved in association with the movement of a cam 5020 which comes into engagement with the carriage HC. The driving force from the drive motor 5013 is controlled by well-known transfer means such as a clutch switching device or the like.

A desired processings of the capping, cleaning, and sucking recovery is executed at the corresponding position by the operation of the lead screw 5005 when the carriage HC reaches the home position side region. It is sufficient that a desired operation is executed at a well-known timing.

Although the above embodiment has been described with respect to the case where the invention can be applied to the laser beam printer shown in FIG. 1 or the ink jet printer shown in FIG. 19, the invention can be also obviously applied to a printer or display device of another printing system.

It will be obviously understood that the invention can be also applied to an information processing apparatus such as a host computer or the like or an integrated information input/output apparatus having a facsimile function, a copying function, a printing function, and a scanner function.

What is claimed is:

1. An output apparatus which receives first information from an external source, generates second information based on the received first information, and outputs the generated second information, said output apparatus comprising:

selection means for discriminating the received first information by comparison of a code included in the first information with codes provided in a plurality of analyzer means and for selecting one of the plurality of analyzer means suitable for the first information; and control means for skipping the received first information when at least one condition in which (i) said selection means can select no suitable analyzer means, (ii) no data is input for a predetermined time to an input interface via which the first information was received, and (iii) the input interface is switched, occurs.

2. An apparatus according to claim 1, wherein the first information comprises a character code and a control code.

3. An apparatus according to claim 2, wherein said selection means selects the one analyzer means by discriminating the control code included in the received first information and a control code which can be analyzed by the one analyzer means.

4. An apparatus according to claim 1, wherein the second information comprises image data.

5. An apparatus according to claim 1, wherein after skipping the received first information, said control means stops output of the second information.

6. An output method which receives first information from an external source, generates second information based on the received first information, and outputs the generated second information, said method comprising the steps of:

discriminating the received first information by comparison of a code included in the first information with codes provided in a plurality of analyzers and selecting one of the plurality of analyzers suitable for the first information; and skipping the received first information when at least one condition in which (i) no suitable analyzer is selected, (ii) no data is input for a predetermined time to an input interface via which the first information was received, and (iii) the input interface is switched, occurs.

7. A method according to claim 6, wherein the first information discriminated in said discriminating step includes a character code and a control code.

8. A method according to claim 7, wherein the one analyzer is selected by discriminating the control code included in the received first information and selecting a control code which can be analyzed by the one analyzer.

9. A method according to claim 6, wherein the second information generated by said method includes image data.

10. A method according to claim 6, wherein after skipping the received first information, said skipping step stops output of the second information.

* * * * *

UNITED STATES PATENT AND TRADEMARK OFFICE
CERTIFICATE OF CORRECTION

PATENT NO. : 6,035,149
DATED : March 7, 2000
INVENTOR(S) : Masamichi Akashi et al.

It is certified that error appears in the above-identified patent and that said Letters Patent is hereby corrected as shown below:

Column 10,
Line 7, "kelp" should read -- key --.

Column 11,
Line 64, "a" should read -- such as a --.

Column 15,
Line 29, ",.electing" should read -- selecting --.

Column 16,
Line 40, "to" should read -- to flicker --.

Column 18,
Line 28, "checks" should read -- check --.

Signed and Sealed this

Twenty-first Day of January, 2003

JAMES E. ROGAN
*Director of the United States Patent and Trademark Office*